United States Patent [19]

Alexander

[11] Patent Number: 4,518,621
[45] Date of Patent: May 21, 1985

[54] METHOD AND APPARATUS FOR FINISHING JUICES FROM FRUITS AND VEGETABLES AND THE LIKE

[75] Inventor: L. Bruce Alexander, San Marino, Calif.

[73] Assignee: Brown International Corporation, Covina, Calif.

[21] Appl. No.: 500,553

[22] Filed: Jun. 2, 1983

[51] Int. Cl.³ .......................... A23P 1/00; B30B 9/26; B01D 33/10
[52] U.S. Cl. .................................. 426/495; 100/117; 100/127; 210/217; 210/375; 210/377; 210/380.3; 210/405; 210/781; 210/784; 210/416.1
[58] Field of Search ............... 210/216, 217, 374, 375, 210/377, 393, 396, 397, 405, 407, 408, 781, 784, 380.3, 416.1; 100/117, 127; 426/495

[56] References Cited

U.S. PATENT DOCUMENTS

| 2,925,180 | 2/1960 | Geiger | 210/374 |
| 4,043,919 | 8/1977 | Hutzler | 210/407 |
| 4,279,197 | 7/1981 | Hunt et al. | 100/117 |
| 4,368,125 | 1/1983 | Murray | 210/374 |

FOREIGN PATENT DOCUMENTS 2457178 1/1981 France ............................... 100/117

Primary Examiner—Ernest G. Therkorn
Attorney, Agent, or Firm—Paul A. Weilein

[57] ABSTRACT

A method and apparatus are disclosed for extracting finished juice from an initial juice including substantial solids or for extracting fluid, preferably finished to a high degree, from any slurry including substantial solids, wherein the slurry is introduced into one end of a cylindrical screen, the cylindrical screen being driven in rotation for centrifugally urging the slurry against the screen and causing fluid from the slurry to pass through the screen. Paddles are arranged for rotation with the screen and for limited movement relative to the screen for continuously spreading the slurry along the screen to facilitate separation of fluid and for moving solid material from the slurry toward an outlet end of the screen for removal, the paddles preferably being mounted on a support drum forming an annular passage adjacent the screen for receiving the slurry, the support drum preferably being driven by differential means adapted for adjusting the relative rates of rotation for the screen and support drum to selectively regulate the amount of movement of the paddles relative to the screen.

27 Claims, 9 Drawing Figures

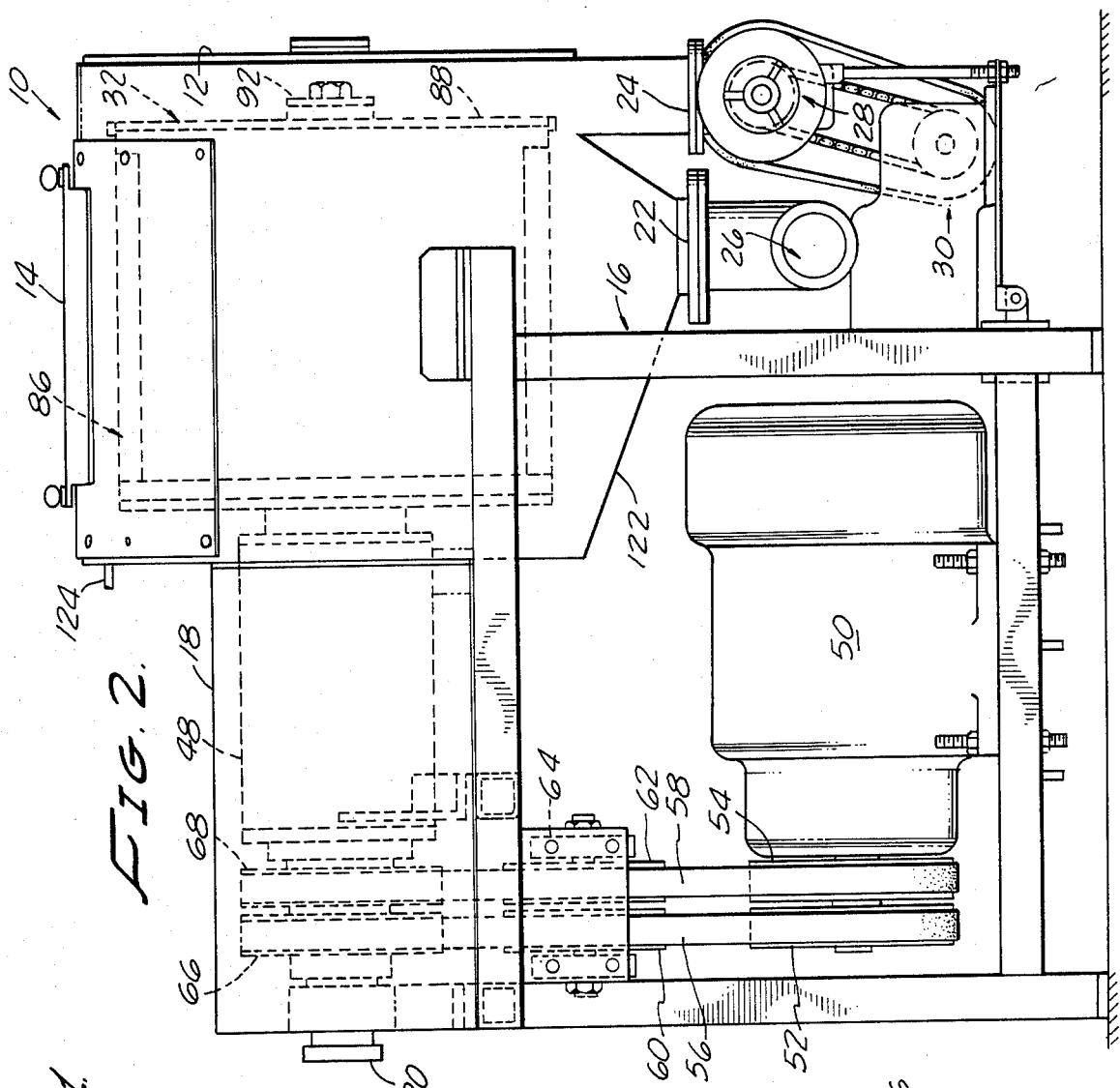
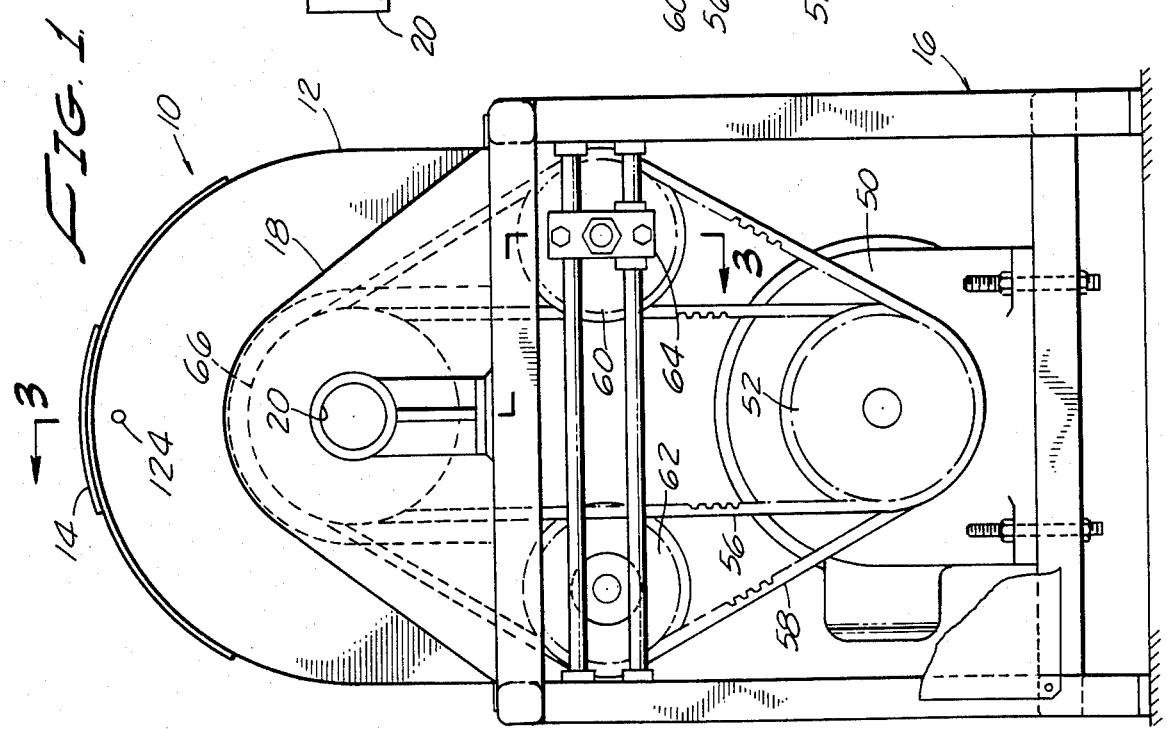

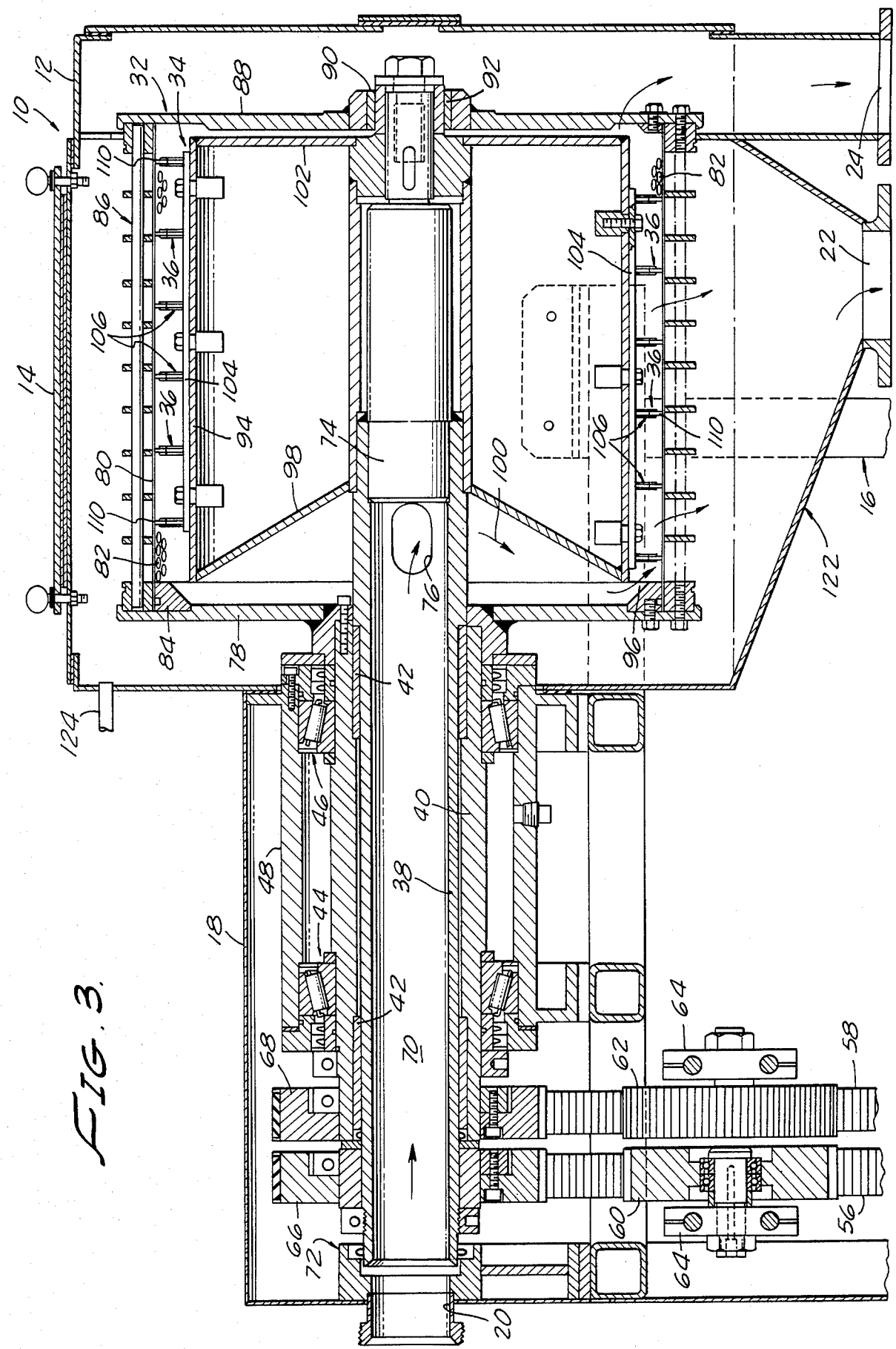

METHOD AND APPARATUS FOR FINISHING JUICES FROM FRUITS AND VEGETABLES AND THE LIKE

BACKGROUND OF THE INVENTION

The present invention relates to a method and apparatus for extracting fluid from a slurry and more particularly to such a method and apparatus for extracting fluid such as juice, finished to a relatively high degree, from a slurry such as an initial juice including substantial solids. It is particularly contemplated that the method and apparatus be employed for use with slurries in the form of initial juices obtained from fruits including citrus fruits and vegetables. However, it will be apparent that the method and apparatus of the invention may be employed in connection with slurries formed from almost any product wherein it is desirable to obtain a relatively finished fluid from a slurry including substantial solids.

In the production of juices from various fruits and vegetables, it has been common practice to first obtain an initial or raw juice which may contain substantial amounts of various solids such as rag, pulp from juice sacs, pectinous material, seeds, etc. Such initial juices have been obtained by various juice extraction machines. Typical examples of such juice extraction machines are disclosed, for example, in U.S. Pat. Nos. 2,631,625 and 4,170,935. In the first noted reference, a machine is disclosed in which fruit or the like is cut in half and transferred into conveyor cups. Rotary reamers are then driven into engagement with the conveyor cups to extract juice from the fruit.

Similarly, U.S. Pat. No. 4,170,935 discloses a machine wherein fruit or the like is cut in half and conducted through gradually convergent paths to flatten the halves and express or extract the pulpy juice therefrom. These machines are effective as primary extractors for obtaining initial or raw juice. However, it is desired to remove solid components from the juice to provide a so-called finished juice.

Typical commercial machines for effecting the conversion of initial juice to finished juice, or removal of components from other types of slurries, have been characterized as either so-called screw-type or paddle-type finishers. In the screw-type finishers, the initial juice or slurry is introduced into a stationary screen. A rotary screw is mounted within the screen and designed to have a fairly close tolerance fit with the screen. Generally, such screw-type finishers are of two different types. In one type the screen and the outside diameter of the screw are tapered with the smallest diameter at the discharge end. The root of the screw is tapered and the pitch of the flights varies so that the cross sectional area between the flights decreases at the discharge end. In other screw-type finishers, the screen and the outside diameter of the screw are cylindrical. The root of the screw may be conical with the large diameter at the discharge end, or the root of the screw may be cylindrical.

In both of the above screw-type finishers, pulp escape valve means are provided at the discharge ends and are either spring or air loaded. As the fluid or juice component from the initial juice or slurry is removed during passage through the screen, substantial solids build up at the discharge end and it is sometimes necessary to apply somewhat excessive air pressure against the valve means to assure removal of additional juice through the built-up solids. Such action has been found to be detrimental to juice quality.

In paddle-type finishers the slurry is introduced into a stationary screen of conical or cylindrical shape. Helical blades are rigidly mounted for rotation within the screen and extend through the length of the screen. These blades function somewhat as a screw to convey the slurry along the screen and force components of the slurry through the screen. The clearance between the elongate blades and the screen must be adjusted in consideration of the components to be forced through the screen from the slurry. This, of course, requires loosening and tightening of the blade fasteners and careful adjustment of the elongate blades, which results in shutdown time.

Accordingly, there has been found to remain a need for an improved finishing method and apparatus capable of overcoming one or more problems of the type outlined above and thereby resulting in production of a finished juice or the like of high quality. It will be apparent that similar advantages can be realized in connection with many other slurries in addition to the specific juices as described above.

SUMMARY OF THE INVENTION

It is therefore an object of the invention to provide a method and apparatus for extracting fluids, finished to a relatively high degree, from a slurry including substantial solids while overcoming one or more problems of the type referred to above.

More particularly, it is an object of the invention to provide such a method and apparatus for separating fluid from substantial solids of a slurry in a finishing machine where the slurry is introduced into one end of a cylindrical screen which is rotatably driven for exerting centrifugal force on the slurry to urge the slurry toward the screen so that fluid from the slurry passes through the screen while solids are retained thereupon. Within such a combination, paddle means are arranged for rotation with the screen, but at a somewhat different speed, for continuously spreading the slurry upon the screen to facilitate separation of fluid therefrom and for moving solids from the slurry toward the other end of the screen for removal.

It is an even further object of the invention to provide such a method and apparatus for finishing fluids wherein the paddle means are mounted on a rotatable support means driven separately from the cylindrical screen. Preferably, differential means are provided for adjusting the relative rates of rotation for the cylindrical screen and the support means in order to selectively regulate movement of the paddle means relative to the screen.

It is a related object of the invention to provide such a method and apparatus wherein the support means for mounting the paddle means comprises a cylindrical drum forming an annular passage adjacent the screen, the paddle means being mounted in relatively free-floating relation upon the cylindrical drum for engagement with the cylindrical screen in the annular passage.

It is preferably contemplated that the paddle means be mounted in uniformly spaced apart relation adjacent the cylindrical screen and arranged helically with relation to the axis of the screen so that relative rotation between the cylindrical screen and the support means for the paddle means will cause the paddle means to move solids axially along the screen.

The method and apparatus disclosed herein is particularly contemplated for use in producing finished juices from initial juices of various fruits and vegetables, particularly citrus fruits. Accordingly, the finishing machine preferably includes means for developing and maintaining a controlled environment about the rotating screen. Such a controlled environment could include, for example, either a vacuum or pressurization with an inert gas.

Additional objects and advantages of the invention are made apparent in the following description having reference to the accompanying drawings.

BRIEF DESCRIPTION OF THE DRAWINGS

Referring to the accompanying drawings, which are for illustrative purposes only:

FIG. 1 is an elevational view taken from one end of a finishing machine constructed in accordance with the present invention;

FIG. 2 is a side elevational view of the finishing machine as viewed from the right of FIG. 1;

FIG. 3 is an enlarged vertical sectional view taken on the line 3—3 of FIG. 1;

DESCRIPTION OF THE PREFERRED EMBODIMENT

Figure 4:
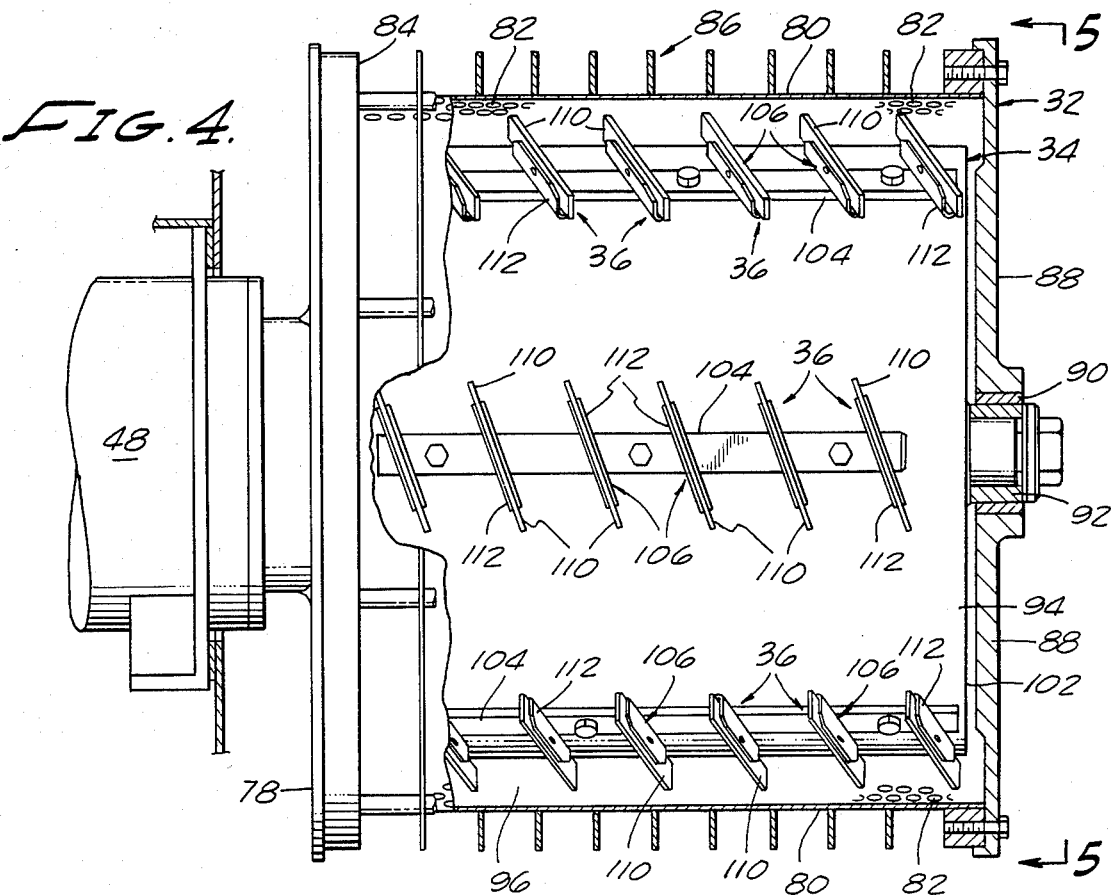
FIG. 4 is an elevational-sectional view showing an internal juice finishing section of the machine including a rotatable screen and cooperative paddles mounted on a rotatable drum.

The present invention is directed to a method and apparatus for extracting fluid, finished to a relatively high degree, from a slurry including substantial solids. As disclosed below, the method and apparatus contemplate the production of a finished juice by removal of solids from an initial or raw juice.

A finishing machine embodying the apparatus of the present invention and operable in accordance with the method of the invention is illustrated in the drawings and hereinafter described in greater detail. In general, the finishing machine includes a cylindrical screen which is rotatable for applying centrifugal force to a slurry introduced into the screen, fluid from the slurry tending to be urged outwardly through the screen while solids are retained thereon. A plurality of paddles are arranged for rotation with the screen while being rotatable relative thereto for uniformly spreading the slurry along the screen to facilitate separation of fluid therefrom and also for moving solid material from the slurry toward a discharge end of the screen.

Through such a combination, the slurry or raw juice tends to be spread evenly and in a relatively thin layer along the surface of the rotating cylindrical screen. The combination avoids the application of relatively harsh mechanical pressure for urging the slurry or solids from the slurry against the screen as was common with prior art finishing machines of the type described above. Although pressure is applied to the fluid and solids urging them against the screen under centrifugal force, the fact that the slurry is in a thin layer without harsh mechanical pressure being applied against it permits the separation of fluid from the slurry to be accomplished in a relatively gentle manner. In particular, where the method and apparatus are being employed for producing finished juices from an initial or raw juice, this feature of the invention tends to prevent solid components of the initial juice from being forced through the screen.

The use of free-floating paddles for moving solids from the slurry along the screen provides another advantage in that the solids are moved toward a discharge point at an end of the cylindrical screen in a generally uniform manner to avoid the piling up or accumulation of solids at any point within the system. The free-floating paddles also serve the purpose of continually turning solids of the slurry or fibrous material from the initial juice to permit a greater amount of finished juice to be recovered from the slurry. At the same time, these paddles are effective to wipe the screen and keep it clean.

With the paddles being mounted on a separate support, relative speeds of rotation for the paddle support and the screen may be adjusted in order to regulate the rate of movement of the paddles relative to the screen. By such adjustment, solids from the slurry may be moved along the screen at varying rates.

Yet another advantage of the invention lies in the ability to maintain a controlled environment about the rotating screen. This is accomplished in a manner hereinafter described, so that separation of a finished juice, for example from an initial or raw juice, may be accomplished under a pressurized atmosphere of an inert gas, for example, or even under a low vacuum if advantageous in the processing of such juices.

These advantages and additional advantages are made apparent in the following description.

Referring to the drawings, particularly FIGS. 1 and 2, a finishing machine, generally indicated at 10, includes a housing 12 having an inspection cover 14. The housing is mounted on a stand or support structure 16. A subhousing portion 18 is also mounted on the stand 16 adjacent the housing 12 for enclosing drive mechanism hereinafter described in detail.

In accordance with the invention, a product such as the initial or raw juice of fruit such as citrus fruit or vegetables is prepared as a liquefied slurry by separation machinery of the type described above and not forming a part of the present invention. In any event, the slurry is introduced into an inlet 20 located at one end of the housing portion 18. A juice outlet 22 is located at the other end of the machine on the main housing 12 along with an outlet 24 for solids or particulate material seprated from the slurry in the finishing machine 10.

Referring to FIG. 2, the juice outlet 22 is connected to an air trap 26 through which the finished juice is discharged. This trap is effective to prevent entrance of air into the apparatus when in operation. The solids outlet 24 communicates with an auger or screw assembly 28 through a conical nozzle (not shown) for conveying the solids from the finishing machine. Thus, the mass of discharged solids forms an effective barrier to prevent entrance of air into the machine. Further, the slurry to be processed is contained in a reservoir (not shown) and is pumped from the bottom thereof into the apparatus with a minimum of entrained air. Thus, it will be appreciated that during operation of the apparatus substantially all air is excluded from entering the apparatus so that the finished juice is substantially free of oxidation.

Referring particularly to FIG. 3, a cylindrical screen assembly 32 is arranged for rotation within the housing 12. A cylindrical drum assembly 34, providing support for a plurality of free-floating paddles 36, is arranged within the cylindrical screen assembly 32. The cylindrical drum assembly 34 and screen assembly 32 are respectively secured for rotation with coaxial inner and outer drive shafts 38 and 40. The inner drive shaft 38 is supported for rotation relative to the outer drive shaft 40 by bearing means 42. The outer drive shaft 40 is rotatably supported by bearings 44 and 46 within a bearing housing 48 mounted on the stand or support structure 16.

Referring particularly to FIGS. 1 and 2, a motor 50 is mounted on a lower portion of the stand 16 and is coupled with a pair of drive pulleys 52 and 54. Drive belts 56 and 58, preferably in the form of timing belts, are trained respectively about the drive pulleys 52 and 54. The drive belts 56 and 58 pass over respective timing idler pulleys 60 and 62 which are mounted on pillow block bearings, one of which is indicated at 64.

The drive belts 56 and 58 are also trained over driven pulleys 66 and 68 which are respectively secured to the inner and outer drive shafts 38 and 40 as best shown in FIG. 3. Thus, the motor serves to drive the screen assembly 32 and cylindrical drum assembly 34 in rotation through the drive mechanisms described above and the drive shafts 38 and 40. The drive mechanism provides a differential function permitting adjustment in the relative rates of rotation for the screen assembly 32 and cylindrical drum assembly 34. It is contemplated within the present invention that the relative rates of rotation for the screen and drum are determined by the sizes of the drive pulleys 52, 54 and/or the driven pulleys 66, 68. As shown in the drawings, the drive pulleys 52 and 54 are of the same size, while the driven pulleys 66 and 68 are of slightly different sizes, causing the drum assembly 34 to rotate at a slightly greater speed of rotation than the screen assembly 32. As will be hereinafter described in greater detail, this differential speed for the drum assembly 34 and screen assembly 32 results in movement of the paddles relative to the screen even while the paddles are rotating on the drum generally with the screen.

Before describing in greater detail the construction of the cylindrical screen assembly 32 and cylindrical drum assembly 34 which form the finishing portion of the machine, having particular reference to FIG. 3, it is noted that the inner drive shaft 38 includes an axially extending passage 70 in communication at one end with the inlet 20. A seal assembly 72 is adapted to maintain a seal between the rotating shaft 38 and the stationary inlet 20. Thus, the seal assembly 72 prevents air or other material from contaminating the slurry or initial juice entering the passage 70 from the inlet 20. The other end of the passage 70 is blocked at 74 while a plurality of radial openings, one of which is indicated at 76, directs slurry from the passage 70 into one end of the screen assembly 32.

Referring now to the construction of the cylindrical screen assembly 32 and cylindrical drum assembly 34, it may be seen that these members are mounted in generally cantilevered fashion upon the respective drive shafts 40 and 38. In particular, the outer drive shaft 40 is secured to the cage support plate 78. The screen assembly 32 includes a cylindrical screen 80, formed with a multiplicity of small openings generally indicated at 82, the screen 80 being secured by suitable means such as a screen guide ring 84 and a support cage 86 which is secured at one end to the support plate 78 and at the other end to a cage support spider 88. The support cage surrounds the cylindrical screen 80 in order to provide reinforcement and to prevent axial movement of the screen when it is being rotated at substantial speeds for centrifugally separating juice from the slurry as hereinafter described. The cage support spider 88 is supported by bearing means 90 mounted on a sleeve 92 secured to the end of the inner shaft 38.

The screen holes 82 may vary from about 0.005" to 0.125" in diameter depending on the type of juice desired, that is, depending upon the pulp level desired in the finished juice. In so-called single finishing of the juice, a screen with openings of about 0.016" to 0.020" in diameter is employed. In so-called double finishing of the juice, the slurry is first processed with a screen having holes about 0.125" in diameter, and the juice product is subsequently further processed with a screen having holes about 0.005" to 0.020" in diameter.

The drum assembly 34 is secured to the inner shaft 38 and includes a cylindrical drum member 94 arranged in inwardly spaced relation with respect to the cylindrical screen 80 to form an elongate annular passage 96 for receiving the flow of juice or slurry as hereinafter described.

One end of the drum 94 is supported on the shaft 38 by a conical wall 98 which cooperatively with the cage support plate 78 forms a radial passage 100 for conducting slurry or initial juice from the inlet 20 through the axial passage 70 and the radial openings 76 into the inlet end of the annular passage 96. The other end of the cylindrical drum 94 is supported on the shaft 38 by a wall 102. With this arrangement, initial juice or slurry entering the annular passage 96 is urged against the rotating screen 80 by centrifugal force. At the same time, the slurry is distributed axially along the screen 80 by operation of the paddles 36, as hereinafter described. The paddles are also effective to move solids from the slurry toward the outlet end of the annular passage 96 from whence the solids may pass through the cage support spider 88 to the solids outlet 24.

Figure 5:
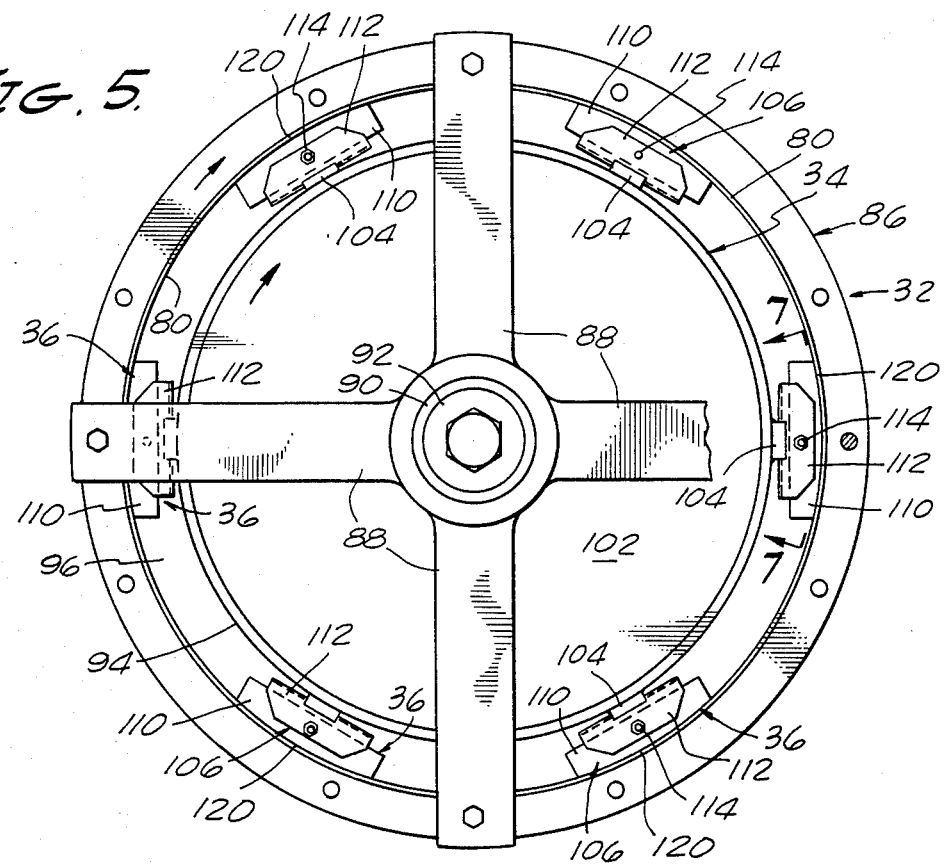
FIG. 5 is an elevational view taken along the line 5—5 of FIG. 4.
Figure 6:
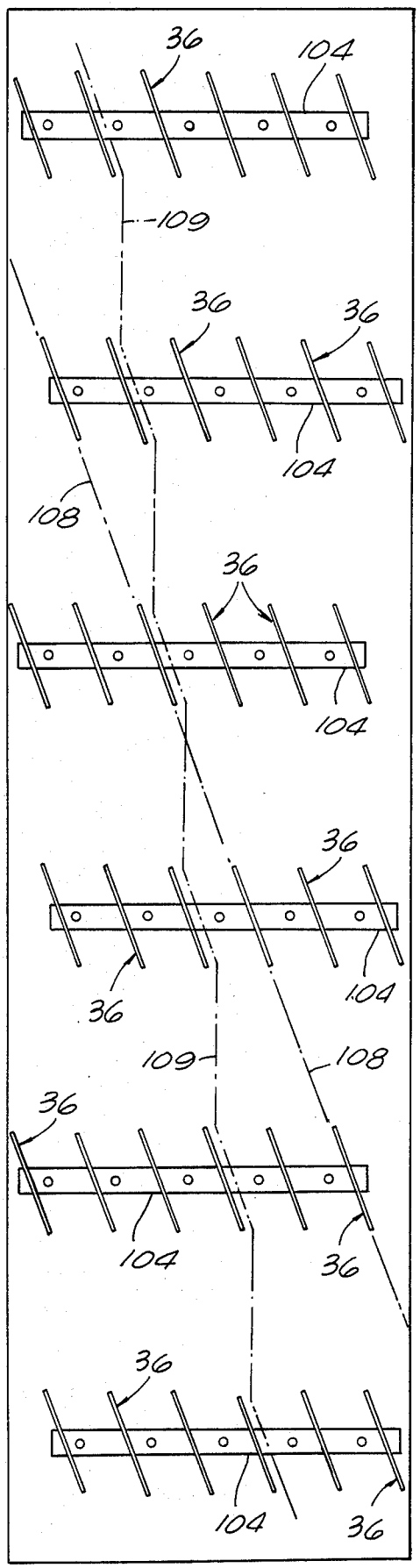
FIG. 6 is a developed view of the surface of the support drum and the paddle arrangement, the paddles being shown schematically to illustrate their helical arrangement relative to the axis of the drum and the screen.

Referring to FIGS. 4–6, the drum 94 is provided with a plurality of axially extending mounting bars 104 which are secured to the drum in circumferentially spaced relation.

The paddles 36 are secured to the mounting bars 104 by free-floating mounting means 106 in parallel relation to each other and in helical alignment relative to the axes of the screen and drum assemblies. The helical alignment of one row of paddles on the drum is indicated by the phantom line 108 in FIG. 6 and the other paddles are similarly arranged on the drum. The phantom line 109 of FIG. 6 indicates the approximate path of travel of the slurry along the screen 80.

The paddles 36 include a wiper blade 110 associated with a mounting plate 112 secured to the bars 104. A bolt 114 passes through aligned openings 116 in the bifurcated mounting plate 112 and an elongated slot 118 formed in the wiper blade 110. The wiper blades 110 are formed with an arcuately shaped outer edge 120 which is configured for mating alignment with the inner surface of the cylindrical screen 80.

Figure 7:
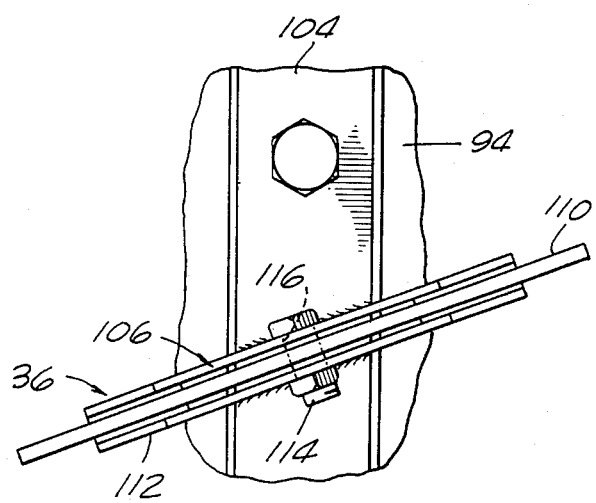
FIG. 7 is a fragmentary view taken along section line 7—7 of FIG. 5 showing one of the paddles and the means for mounting it on the drum.
Figure 8:
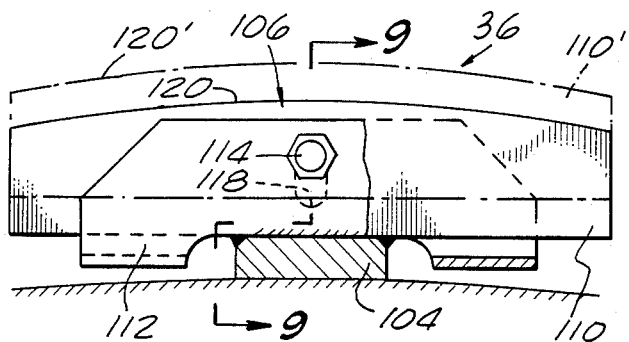
FIG. 8 is a side view of the paddle and mounting means of FIG. 7.
Figure 9:
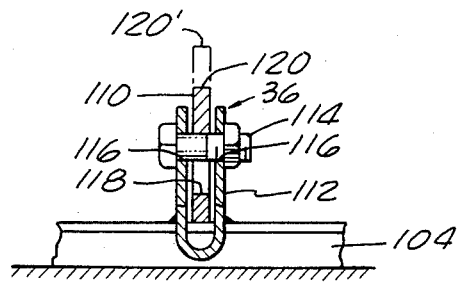
FIG. 9 is a sectional view taken along the line 9—9 of FIG. 8.

Thus, the blades 110 are free to move radially relative to the drum 94 by virtue of the elongated slots 118. At the same time, the blades may also pivot to some extent about the axis of the bolt 114. Thus, as the cylindrical drum 94 is driven in rotation, generally with the cylindrical screen 80, the paddles or blades 110 are urged radially outwardly by centrifugal force toward a position illustrated in phantom at 110' in FIG. 7. The configuration of the blades is selected so that their outer surfaces or edges 120 are intimately engageable with the inner surface of the cylindrical screen 80. However, the free-floating mounting of the blades 110 permits them to yield inwardly as required.

Due to the construction and arrangement of the paddles, it will be apparent that relative rotation between the screen assembly 32 and the drum assembly 34 will cause the blades 110 to be urged radially outwardly into wiping relation with the screen 80. At the same time, the blades will move slurry solids along the screen and through the cage support spider 88, from whence it is discharged through the outlet 24. Further, the blades will tend to agitate or tumble solids on the screen, thereby resulting in the extraction of a maximum amount of fluid or juice from the solids by centrifugal force and in a relatively gentle manner. Thus, as the solids are moved along the length of the screen as viewed in FIG. 3, the present invention provides a particularly effective means for removing from a slurry of juice and solids, substantially all of the juice under the influence of centrifugal force rather than by mechanical pressing as was commonly employed in the prior art.

As the fluid or juice passes through the screen 80, it is collected in a pan assembly 122 formed by the lower portion of the housing 12 for passage into the juice outlet 22.

As noted above, the relative rotational speeds of the screen assembly 32 and drum assembly 34 may be adjusted in a number of different manners, for example, by varying the effective diameters of the driven pulleys 66 and 68. The relative rates of rotation for the screen assembly and drum assembly may be selected so that solids from the slurry approach the discharge end of the annular passage 96 for delivery to the solids outlet 24 just as substantially all available fluid or juice is extracted therefrom and passed through the screen 80.

The finishing machine 10 is also adapted for development of a selected environment about the rotating screen assembly 32. For this purpose, the housing 12 is a closed structure. At the same time, the seal assembly 72 also maintains the closure at the junction between the fluid inlet 20 and the inner drive shaft 38. The fluid or juice outlet 22 and the solids outlet 24 are also adapted as described above to assist in the maintenance of a controlled environment within the housing.

Access to the interior of the housing 12 is provided by a fitting 124 which may be employed, for example, to introduce a vacuum within the housing or to pressurize the housing with an inert gas, for example nitrogen, in order to enhance the quality of the fluid or finished juice obtained in the machine. In particular, where the machine is employed for the production of finished juices, this feature of the invention is particularly contemplated for preventing oxidation which might otherwise have a deleterious effect on quality of the finished juice.

The method of operation for the finishing machine of the present invention is believed apparent from the preceding description. However, the method of operation is summarized briefly below in order to ensure a complete understanding of the invention.

Initially, a slurry, such as an initial or raw juice, is pumped into the machine through the inlet 20 for passage through the inner shaft 38 and through the openings 76 for admission to the inlet end of the annular passage 96 as viewed in FIG. 3. With the screen assembly 32 and drum assembly 34 being driven at carefully selected rates of rotation, preferably within the drum rotation at a slightly faster rate of speed, centrifugal force tends to urge the initial juice outwardly from the radial openings 76 toward the annular passage 96 and against the screen 80. The rotating conical wall 98 is effective to distribute the slurry uniformly onto the screen 80. The effect of centrifugal force urges the fluid portion of the slurry through the screen 80 for passage toward the juice outlet 22.

The paddles 36 which are rotating generally with the screen 80, while moving relative thereto because of differential travel between the screen and drum, perform at least three functions. Initially, they spread the slurry along the inner surface of the screen 80. They also tend to turn or gently agitate the slurry in order to more completely free fluid from the solids for passage through the screen. Furthermore, the paddles are effective to shift the solids axially of the screen. Thus, the solids are conducted to the discharge end of the passage 96 for transmission to the solids outlet 24 at approximately the same time that substantially all available fluid has been removed from the solids and passed through the screen 80 under the influence of centrifugal force. The solids are then collected from the solids outlet 24 and juice is collected from the juice outlet 22 in the same manner described above.

The relative rates of rotation for the screen assembly 32 and drum assembly 34 may be adjusted as necessary depending upon various conditions including the nature of the initial juice or slurry being treated within the finishing machine. Similarly, a controlled environment may be developed within the housing through the fitting 124 as described above.

Accordingly, there has been disclosed a method and apparatus for extracting fluids or juices, finished to a relatively high degree, from a slurry or initial juice including substantial solids. Numerous variations and modifications will be apparent from the description. Accordingly, the invention is defined only by the following appended claims.

What is claimed is:

1. A finishing machine for removing solids from slurries and the like, comprising:
    a housing,
    a cylindrical screen means mounted for rotation in said housing,
    inlet means for introducing the slurry into one end of said cylindrical screen means,
    outlet means for receiving solids from the other end of said cylindrical screen means,
    means for driving said cylindrical screen means in order to centrifugally urge fluid components of the slurry through said screen means,
    a cylindrical support structure arranged axially within and adapted for rotation relative to said screen means, a plurality of paddle means having wiper means formed thereon, and mounting means for securing said paddle means upon said cylindrical support structure in helical alignment relative to the axis of said screen means while permitting radial movement of said paddle means in response to centrifugal force developed by rotation of said support means for maintaining said wiper means in generally constant wiping engagement with said screen means along substantially its entire axial length whereby said paddle means serve to distribute the slurry generally uniformly on said screen means while simultaneously urging solids from the slurry toward said solids outlet and wiping clean said screen means to promote separation of slurry liquid from slurry solids and flow of the slurry liquid through said screen means.

2. The finishing machine of claim 1 wherein said paddle means comprises a plurality of free-floating paddles each having a wiper edge shaped for intimate contact with a cylindrical surface portion of said screen means, said paddles being mounted on said support structure in a plurality of helical rows in order to gently agitate the slurry and more completely free fluid from the slurry solids for passage through said screen means as the solids are urged axially toward said solids outlet.

3. The finishing machine of claim 2 wherein said paddle means are mounted on said support structure by bolt means, said paddle means being capable of pivotal movement about the axes of said mounting bolts.

4. The finishing machine of claim 2 wherein said cylindrical support structure comprises a cylindrical drum forming an annular passage adjacent said screen means for receiving slurry from said slurry inlet, said paddles being arranged in said annular passage, solids tending to pass from said annular passage toward said solids outlet.

5. The finishing machine of claim 1 being adapted for separating a finished juice from solid components of an initial juice.

6. The finishing machine of claim 5 wherein said housing is adapted for maintaining a controlled environment about said screen means.

7. The finishing machine of claim 1 further comprising one shaft extending toward said screen means from said slurry inlet and providing a passage extending axially from said slurry inlet for communication with said one end of said screen means, said one shaft forming a plurality of radial openings in communication with said passage for uniformly directing the slurry circumferentially about said one end of said screen means.

8. The finishing machine of claim 7 wherein said cylindrical support structure comprises a cylindrical drum forming an annular passage adjacent said screen means, said cylindrical support structure also comprising a conical wall for receiving slurry from said radial opening and conducting the slurry into said annular passage.

9. In a method for extracting fluid, finished to a relatively high degree, from a slurry including substantial solids, the steps comprising:

mounting a cylindrical screen means for rotation in a housing, supplying slurry into one end of said cylindrical screen means, rotating said screen means to exert centrifugal force on the slurry for urging the slurry fluid to pass through said screen means, receiving slurry solids at the other end of said cylindrical screen means, collecting finished fluid after it passes through said screen means, providing a cylindrical support structure arranged coaxially within and adapted for rotation relative to said screen means, and mounting upon said cylindrical support structure a plurality of paddle means each having wiper means formed thereon, said paddle means being secured upon said cylindrical support structure in helical alignment relative to the axis of said screen means while permitting radial movement of said paddle means in response to centrifugal force developed by rotation of said support means for maintaining said wiper means in generally continuous wiping engagement with said screen means along substantially its entire axial length whereby said paddle means serve to distribute the slurry generally uniformly on said screen means while simultaneously urging solids toward the other end of said cylindrical screen means and wiping clean said screen means to promote separation of slurry liquid from slurry solids and flow of the slurry liquid through said screen means.

10. The method of claim 9 further comprising the step of arranging said paddle means in a plurality of helical rows in order to gently agitate the slurry and more completely free fluid from the slurry solids for passge through said screen means as the solids are urged axially along said screen means.

11. The method of claim 10 further comprising the step of forming said cylindrical support structure as a cylindrical drum to provide an annular passage adjacent said screen means for receiving the slurry, said paddle means being arranged in said annular passages, solids tending to pass axially through said annular passage toward the other end of said screen means.

12. The method of claim 9 being carried out for separating a finished juice from solid components of an initial juice.

13. The method of claim 12 wherein said housing is adapted for maintaining a controlled environment about said screen means.

14. The method of claim 9 further comprising one shaft extending toward said screen means from said slurry inlet and providing a passage extending axially from said slurry inlet for communication with said one end of said screen means, said one shaft forming a plurality of radial openings in communication with said passage for uniformly directly the slurry circumferentially about said one end of said screen means.

15. The method of claim 14 wherein said cylindrical support structure comprises a cylindrical drum forming an annular passage adjacent said screen means, said cylindrical support structure also comprising a conical wall for receiving slurry from said radial opening and conducting the slurry into said annular passage.

16. In a finishing machine for extracting fluid, finished to a high degree, from a slurry including substantial solids, comprising:

a housing, a cylindrical screen means mounted for rotation in said housing for retaining solid material from the slurry while allowing passage of slurry fluid through said screen means, a slurry inlet in said housing for supplying slurry into one end of said cylindrical screen means, an outlet in said housing for receiving solids from the other end of said cylindrical screen means, a finished fluid outlet in said housing, drive means for rotating said screen means to exert centrifugal force on the slurry, and paddle means arranged for rotation within said cylindrical screen means and for movement relative thereto for spreading the slurry along said screen means to facilitate separation of fluid therefrom and for moving the solid material from the slurry toward said solids outlet, one shaft extending toward the screen means from the slurry inlet and providing a passage extending axially from the slurry inlet for communication with the one end of the screen means, a support means arranged axially within and adapted for rotation relative to said screen means, mounting means for securing said paddle means upon said support means in helical alignment relative to said screen means, said mounting means including means for permitting radial movement of said paddle means in response to centrifugal force in order to maintain said paddle means in generally constant wiping engagement with said screen means, and drive means for operatively rotating the paddle means, said one shaft forming a driving interconnection between said support means and said drive means.

17. The finishing machine of claim 16 further comprising another hollow shaft interconnecting the screen means with said drive means for rotating the screen means, said one shaft being arranged within said hollow shaft, and bearing means for supporting said hollow shaft relative to said housing.

18. The finishing machine of claim 17 wherein said paddle means comprises a plurality of free-floating paddles each having a wiper edge for contact with the surface of said screen means, said support means mounting said free-floating paddles in spaced-apart relation thereupon.

19. The finishing machine of claim 17 wherein said housing is adapted for maintaining a controlled environment about the screen means.

20. The finishing machine of claim 19 being adapted for separating a finished juice from solid components of an initial juice.

21. The finishing machine of claim 19 further comprising means for introducing an inert gas atmosphere into said housing.

22. The finishing machine of claim 21 wherein said inert gas is nitrogen.

23. The finishing machine of claim 16 being adapted for separating a finished juice from solid components of an initial juice.

24. The finishing machine of claim 23 wherein said housing is adapted for maintaining a controlled environment about the screen means.

25. The finishing machine of claim 16 wherein said paddle means comprises a plurality of free-floating paddles each having a wiper edge for contact with the surface of said screen means and support means for mounting said free-floating paddles in spaced-apart relation about the axis of said screen means for rotation of said paddles relative to said screen means.

26. A finishing machine for extracting fluid, finished to a high degree, from a slurry including substantial solids, comprising:

a housing, a cylindrical screen means mounted for rotation in said housing for retaining solid material from the slurry while allowing passage of slurry fluid through said screen means, a slurry inlet in said housing for supplying slurry into one end of said cylindrical screen means, an outlet in said housing for receiving solids from the other end of said cylindrical screen means, a finished fluid outlet in said housing, drive means for rotating said screen means to exert centrifugal force on the slurry, and paddle means arranged for rotation within said cylindrical screen means and for movement relative thereto for spreading the slurry along said screen means to facilitate separation of fluid therefrom and for moving the solid material from the slurry toward said solids outlet, a support means arranged axially within and adapted for rotation relative to said screen means, mounting means for securing said paddle means upon said support means in helical alignment relatiave to said screen means said mounting means including means for permitting radial movement of said paddle means in response to centrifugal force in order to maintain said paddle means in generally constant wiping engagement with said screen means, means for introducing an inert gas atmosphere into said housing, the housing being a closed structure in order to maintain said inert gas atmosphere therein, and the solids outlet and fluid outlet comprising means for maintaining the inert gas atmosphere within the housing.

27. The finishing machine of claim 26 wherein said inert gas is nitrogen.

* * * * *